United States Patent
Herzog et al.

(10) Patent No.: US 10,639,881 B2
(45) Date of Patent: May 5, 2020

(54) POWDER MODULE FOR AN APPARATUS FOR ADDITIVE MANUFACTURING OF THREE-DIMENSIONAL OBJECTS

(71) Applicant: CL SCHUTZRECHTSVERWALTUNGS GMBH, Lichtenfels (DE)

(72) Inventors: Frank Herzog, Lichtenfels (DE); Frank Schödel, Kronach (DE); Florian Bechmann, Lichtenfels (DE)

(73) Assignee: Concept Laser GmbH, Lichtenfels (DE)

( * ) Notice: Subject to any disclaimer, the term of this patent is extended or adjusted under 35 U.S.C. 154(b) by 279 days.

(21) Appl. No.: 15/663,544

(22) Filed: Jul. 28, 2017

(65) Prior Publication Data

US 2018/0029349 A1    Feb. 1, 2018

(30) Foreign Application Priority Data

Jul. 29, 2016  (DE) ......................... 10 2016 114 056

(51) Int. Cl.
*B29C 64/245*    (2017.01)
*B33Y 50/02*    (2015.01)
(Continued)

(52) U.S. Cl.
CPC ............ *B33Y 50/02* (2014.12); *B22F 3/1055* (2013.01); *B29C 64/236* (2017.08);
(Continued)

(58) Field of Classification Search
CPC ........................... B29C 64/245; B29C 64/255
See application file for complete search history.

(56) References Cited

U.S. PATENT DOCUMENTS 6,554,600 B1 *    4/2003    Hofmann ................ B29C 41/34
                                                425/174.4
2012/0291701 A1 *  11/2012   Grasegger ............. B29C 64/141
                                                118/300
(Continued)

FOREIGN PATENT DOCUMENTS

CN    104640652 A    5/2015
CN    104908323 A    9/2015
(Continued)

OTHER PUBLICATIONS

European Search Opinion Corresponding to Application No. 17172786 dated Dec. 11, 2017.
(Continued)

*Primary Examiner* — Timothy Kennedy
(74) *Attorney, Agent, or Firm* — Dority & Manning, P.A.

(57) ABSTRACT

The invention relates to a powder module (1) for an apparatus for additive manufacturing of three-dimensional objects, comprising:
a powder chamber (2) limiting a powder room (3) that can be filled with powdered construction material, a carrying device (4) arranged in the powder room (3), limiting the powder room (3) at the bottom and movably supported relative to the powder chamber (2), and a drive device (5) for generating a force setting the carrying device (4) in motion relative to the powder chamber (2), wherein the drive device (5) comprises at least two separate adjustment units (6a, 6b), that especially are coupled for movement, with at least one, especially cylindrical, adjustment element (7a, 7b), wherein each adjustment element (7a, 7b) is movably supported relative to a respective housing element (8a, 8b) of the respective adjustment unit (6a, 6b) between a first end position and a second end position.

20 Claims, 5 Drawing Sheets

Figure 1:
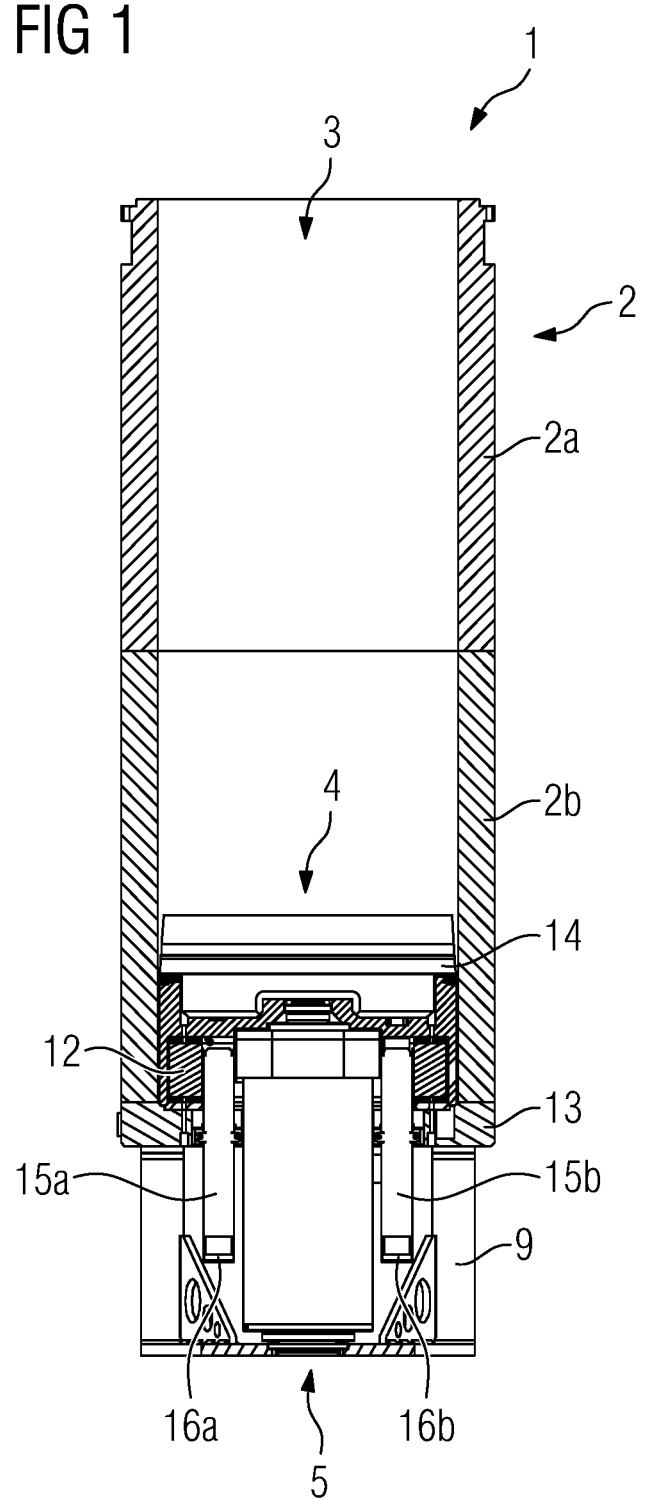

(51) Int. Cl.
- *B29C 64/236* (2017.01)
- *B22F 3/105* (2006.01)
- *B33Y 10/00* (2015.01)
- *B33Y 30/00* (2015.01)
- *B33Y 40/00* (2020.01)
- *B29C 64/307* (2017.01)
- *B29C 64/165* (2017.01)
- *B29C 64/153* (2017.01)
- *B29C 64/255* (2017.01)

(52) U.S. Cl.
CPC ............ *B29C 64/245* (2017.08); *B33Y 10/00* (2014.12); *B33Y 30/00* (2014.12); *B33Y 40/00* (2014.12); *B22F 2003/1056* (2013.01); *B22F 2999/00* (2013.01); *B29C 64/153* (2017.08); *B29C 64/165* (2017.08); *B29C 64/255* (2017.08); *B29C 64/307* (2017.08)

(56) References Cited

U.S. PATENT DOCUMENTS

| | | | |
|---|---|---|---|
| 2013/0108726 A1* | 5/2013 | Uckelmann | B29C 64/245 425/174.4 |
| 2015/0202687 A1 | 7/2015 | Pialot et al. | |
| 2016/0067780 A1 | 3/2016 | Zediker | |
| 2016/0159006 A1* | 6/2016 | Wang | B33Y 30/00 425/166 |
| 2016/0361834 A1* | 12/2016 | Chen-Iun-Tai | B28B 1/001 |
| 2017/0021527 A1* | 1/2017 | Grivetti | E04G 21/04 |
| 2017/0129010 A1 | 5/2017 | Murata et al. | |
| 2017/0232679 A1* | 8/2017 | Gardiner | B29C 64/40 425/162 |

FOREIGN PATENT DOCUMENTS

| | | |
|---|---|---|
| DE | 3617990 C2 | 2/1995 |
| DE | 102010006939 A1 | 8/2011 |
| DE | 102012014840 A1 | 1/2014 |
| EP | 2156942 A1 | 2/2010 |
| EP | 3159142 A1 | 6/2015 |
| EP | 3159142 A1 | 4/2017 |
| JP | 2015155188 A | 8/2015 |
| JP | 2016002725 A | 1/2016 |
| WO | 2014020085 A2 | 2/2014 |
| WO | WO2014179345 A1 | 11/2014 |
| WO | 2015194398 A1 | 12/2015 |
| WO | WO2015194398 A1 | 12/2015 |

OTHER PUBLICATIONS

European Search Report Corresponding to Application No. 17172786 dated Dec. 11, 2017.
German Search Results Corresponding to Application No. 102016114056 on Apr. 11, 2018.
Japanese Office Action Corresponding to Application No. 20171355922 dated Nov. 21, 2018.
Chinese Office Action Corresponding to Application No. 201710630641.9 dated Feb. 27, 2019.
Chinese Office Action Corresponding to Application No. 201710630641.9 dated Aug. 2, 2019.
Chinese Search Results Corresponding to Application No. 2017106306419 dated Feb. 19, 2019.
Japanese Office Action Corresponding to Application No. 20171355922 dated Sep. 20, 2019.

* cited by examiner

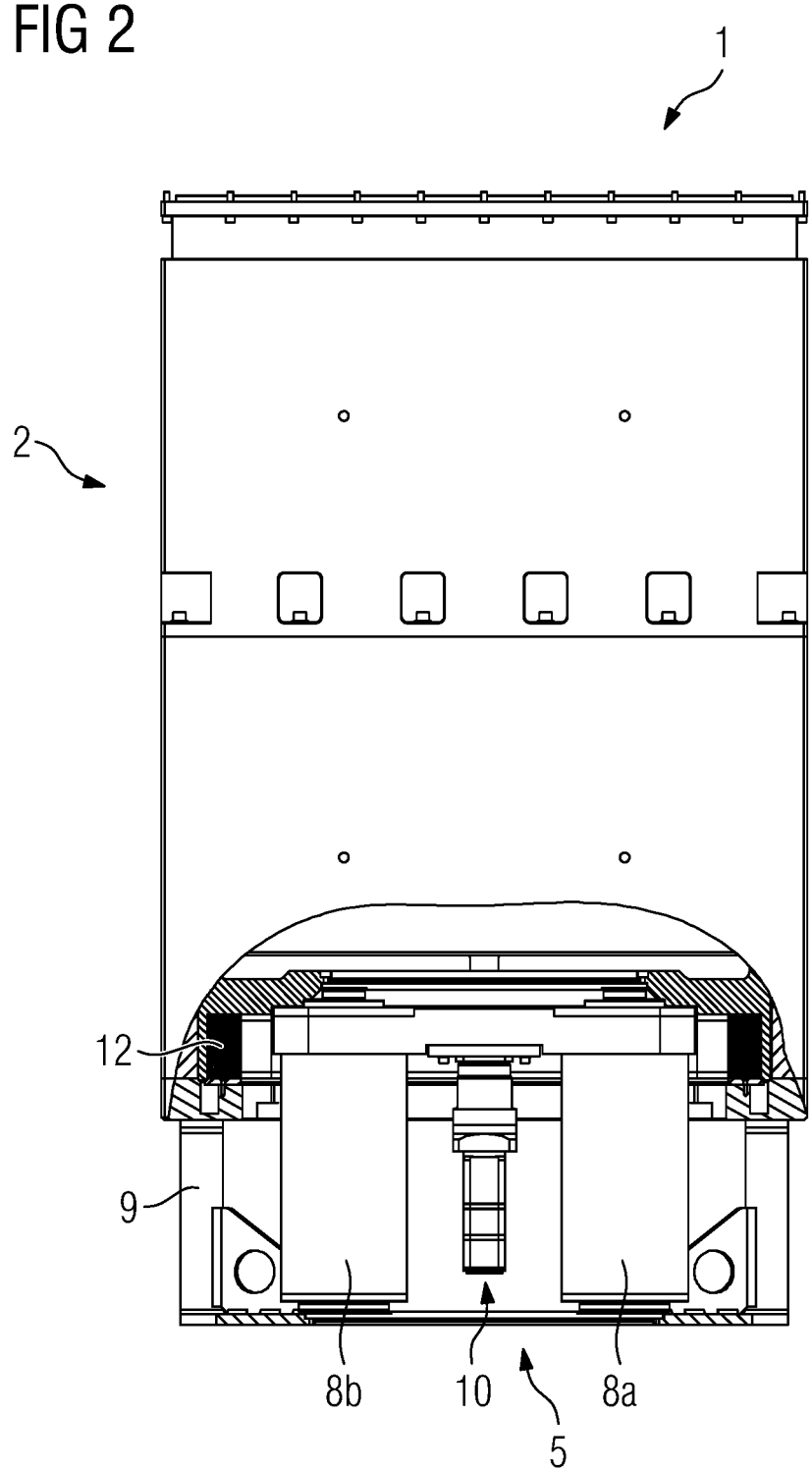

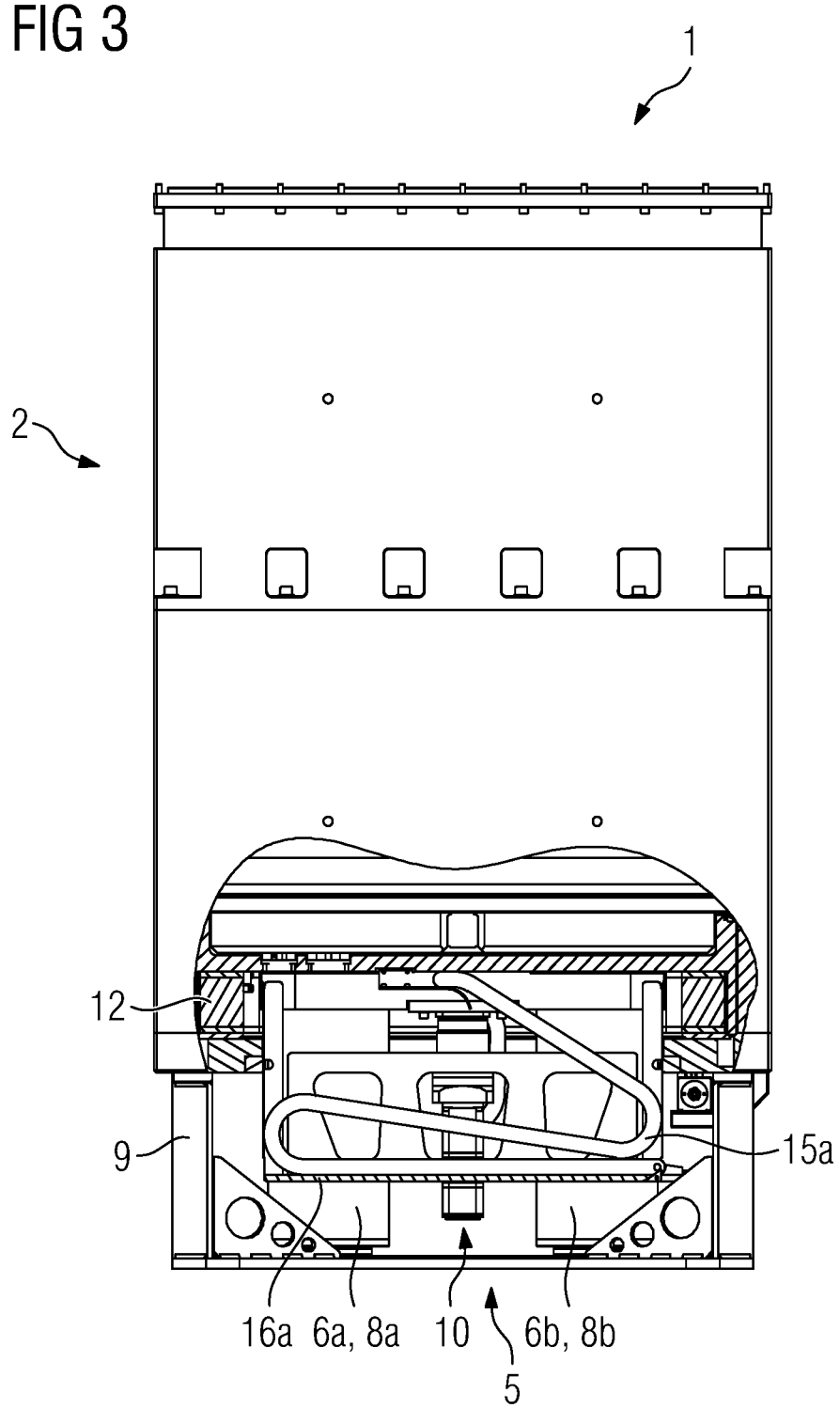

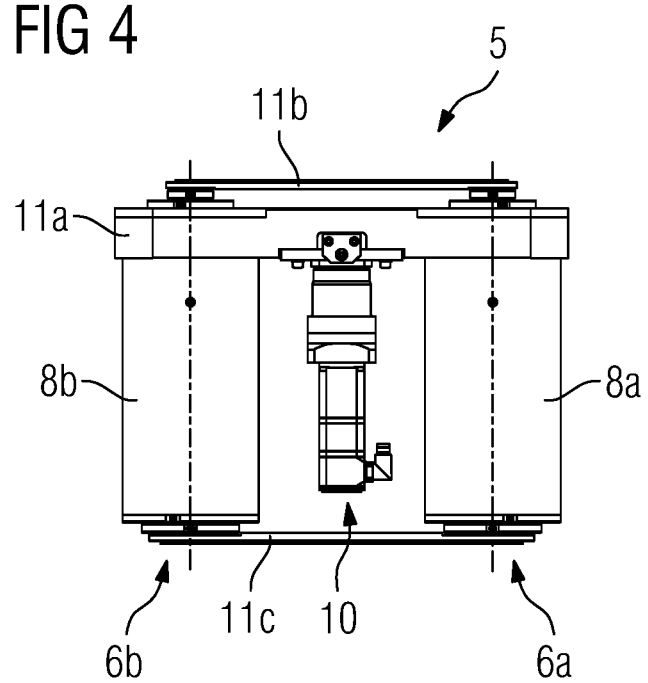

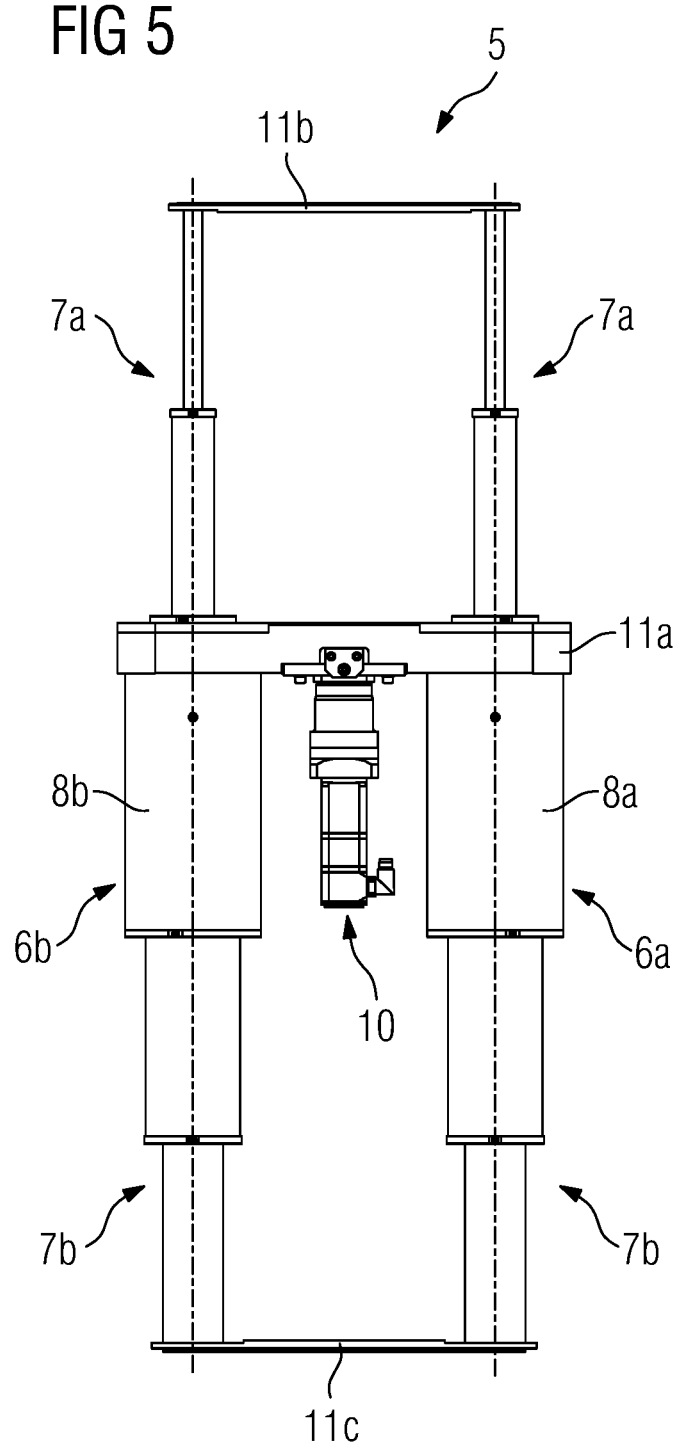

POWDER MODULE FOR AN APPARATUS FOR ADDITIVE MANUFACTURING OF THREE-DIMENSIONAL OBJECTS

CROSS-REFERENCE TO RELATED APPLICATIONS

This application claims priority to German Patent Application serial no. 10 2016 114 056.2 filed Jul. 29, 2016, the contents of which is incorporated herein by reference in its entirety as if set forth verbatim.

The invention relates to a powder module for an apparatus for additive manufacturing of three-dimensional objects, comprising a powder chamber limiting a powder room that can be filled with powdered construction material, a carrying device arranged in the powder room, limiting the powder room at the bottom and movably supported relative to the powder chamber, and a drive device for generating a force setting the carrying device in motion relative to the powder chamber.

Such powder modules, for example in the form of construction or metering modules, are known as functional components of apparatuses for additive manufacturing of three-dimensional objects. In respective powder modules, a possibly accurate and reliable movement of respective carrying devices relative to respective powder chambers is of significant importance. A possibly accurate and reliable movement or control of respective carrying devices is also especially to be ensured for comparatively long (high) traveling distances (liftings) of the carrying devices, i.e. typically traveling distances of the carrying devices of above 500 mm.

Previous drive devices employed in respective powder modules could be improved or further developed in terms of accuracy and reliability of the movements of the carrying devices that can be realized or are realized by said devices.

Thus, the invention is based on the object of providing, especially in terms of accuracy and reliability of the movements of the carrying device realized by means of the drive device, an improved powder module for an apparatus for additive manufacturing of three-dimensional objects.

The object is solved by a powder module for an apparatus for additive manufacturing of three-dimensional objects according to claim 1. The dependent claims relate to possible embodiments of the powder module.

The powder module described herein represents a functional component of an apparatus for additive manufacturing of three-dimensional objects. A respective apparatus is provided for the additive manufacturing of at least one three-dimensional object (hereinafter, in short, referred to as "object") by successive, selective layer-by-layer exposure and thus solidification of individual construction material layers of a powdered construction material (hereinafter, in short, referred to as "construction material") that can be solidified by means of at least one energy beam. The construction material can be a metal powder, plastic powder and/or ceramic powder. Metal powders, plastic powders or ceramic powders can also be interpreted to include a powder mixture of different metals, plastics or ceramics. The energy beam can be a laser beam. The apparatus can correspondingly be an apparatus for performing selective laser melting methods (SLM methods in short) or selective laser sintering methods (SLS methods in short), i.e. a selective laser melting apparatus (SLM apparatus) or a selective laser sintering apparatus (SLS apparatus).

The powder module can generally be any powder module, which is provided for receiving and/or dispensing construction material. In particular, the powder module can be a construction module in which the actual additive construction of three-dimensional objects is performed and which, for this purpose, is filled with construction material to be solidified in a successive, selective layer-by-layer manner when performing additive manufacturing processes, a metering module via which, when performing additive manufacturing processes, construction material is metered out into a process chamber successively and in layers, or a collector module which, when performing additive manufacturing processes, is filled with construction material that is not solidified.

The powder module comprises a powder chamber. The powder chamber limits a powder room that can be filled with construction material. The powder room is limited at least on the side by walls (powder chamber walls) of the powder chamber generally formed like a hollow parallelepiped or like a hollow cylinder.

At the bottom, the powder room is limited by a carrying device. The carrying device can comprise a table-like base body and at least one, especially several, plate-like or plate-shaped supporting bodies arranged or formed on the base body in a stacked-like manner. Respective supporting bodies can be differently functionalized. Respective supporting bodies can e.g. be a construction plate, a heater and a (thermal) insulating body. Between directly adjacent supporting bodies, sealing elements can at least partially be arranged or formed.

The carrying device is typically movably supported between two end positions, i.e. between an upper end position (related to the height of the powder module) and a lower end position, relative to the powder chamber. The movable support of the carrying device enables the realization of an especially linear movement of the carrying device along a vertical movement axis or in a vertical movement direction. The maximum traveling distance of the carrying device can be between 800 and 2,000 mm, especially between 950 and 1,050 mm.

The movable support of the carrying device is realized by a drive device coupled to said carrying device. The drive device is provided for forming or generating a force (driving force) setting the carrying device in a respective motion relative to the powder chamber. The drive device can e.g. be formed (electro) mechanically, hydraulically or pneumatically.

It is significant to the drive device that it comprises at least two separate adjustment units. The adjustment units also referred to or considered as adjustment actuators are typically arranged in parallel next to each other. The adjustment units can typically be coupled for movement. The adjustment units are typically driven equally or synchronously.

Each adjustment unit comprises at least one adjustment element. The adjustment elements of the adjustment unit are typically arranged in parallel next to each other. Each adjustment element is movably supported relative to a respective housing element or part of the respective adjustment unit, in which various components of the respective adjustment unit are arranged or formed, between a first end position and a second end position, and vice versa. The first end position can correspond to an end position of the respective adjustment element (fully) extended from the housing element, and the second end position can correspond to an end position of the respective adjustment element (fully) retracted into the housing element. In the first end position of the adjustment element, the carrying device is typically moved into its upper end position; the first end position of the adjustment element hence typically corresponds to the upper end position of the carrying device. In the second end position of the adjustment element, the carrying device is typically moved into its lower end position; the second end position of the adjustment element hence typically corresponds to the lower end position of the carrying device.

A respective adjustment element can have a cylindrical base shape. A respective adjustment element can be a simple adjustment cylinder. Alternatively, the respective adjustment element can be a telescope cylinder that comprises several adjustment element portions arranged in each other that can be moved relative to each other. Said telescope-like or telescope-shaped design of an adjustment element is purposeful, especially in terms of the realization of comparatively large traveling distances (liftings), i.e. especially traveling distances of at least 500 mm, of the carrying device. In addition, the telescope-like or telescope-shaped design of an adjustment element enables an extremely compact design, especially in terms of the (maximum) traveling distance (lifting) that can be realized with said element. The compact design of the drive device accounts for the typically small space or room available in a respective powder module.

The drive device described enables an accurate and reliable realization or control of movements of the carrying device. By using a respective drive device, an improved powder module is overall provided in terms of accuracy and reliability of the movements of the carrying device realized with the drive device. Similarly, the drive device described is designed extremely compactly, especially in terms of the (maximum) traveling distances (liftings) that can be realized with said device. The drive device or the powder module can readily be integrated in the existing system or machine structure of devices for additive manufacturing of three-dimensional objects; despite the large liftings that can be realized by means of the drive device, typically a change of system or machine structure is not required.

Each adjustment unit can at least comprise a first, especially telescope-like, adjustment element movably supported between a first end position and a second end position, and at least a second, especially telescope-like, adjustment element movably supported between a first and a second end position. A respective first adjustment element can typically be coupled or is typically coupled with the carrying device; a respective second adjustment element can typically be coupled or is typically coupled with a support structure of the powder module, supporting the powder chamber.

Designing the adjustment units with several adjustment elements allows for an enlargement of the traveling distances that can be realized with the respective adjustment unit. The respective adjustment elements of the adjustment unit can, depending on the implementation of the coupling, be moved synchronously or asynchronously with at least one drive unit associated with the drive device between its respective end positions. The movements of the adjustment elements can be equally or differently directed. The traveling distance (overall lifting) that can overall be realized with a respective adjustment unit hence results from the sum of the sub-traveling distances (sub-liftings) that can be realized by means of the adjustment elements associated with the adjustment unit, between the respective first and second end positions thereof. Typically, the adjustment elements of an adjustment unit are connected in series, i.e. arranged and aligned in a common (vertical) axis, which is typically parallel to the (vertical) movement axis of the carrying device.

It was mentioned before that the drive device is associated with at least one drive unit. The drive unit, which is typically formed as or at least comprises a drive motor, is provided for generating a force setting the carrying device in motion relative to the powder chamber. The force generated by the drive unit is transmitted via suitable force transmission elements, i.e. belts, pinions, etc. to the respective adjustment units or the respective adjustment elements of the adjustment unit to move these elements between the respective end positions thereof. A specific example of an arrangement of respective force transmission elements provides a force transmission belt interconnected between the drive unit and an adjustment piston of the adjustment unit, e.g. in the shape of a thread drive, especially a spindle or a ball-type linear drive. The force transmission belt is typically coupled with the pinion end of the drive unit and the driving side of the adjustment piston of the adjustment unit.

Above it was already mentioned that the at least two adjustment units are typically arranged in parallel next to each other. The adjustment units can be connected with each other by at least one cross connection structure, which can e.g. be a crossbeam or a crossbar. Of course, the adjustment units can also be connected with each other by several cross connection structures arranged in parallel. The at least two adjustment units can e.g. be connected with each other by at least one first cross connection structure (middle cross connection structure) in the section of a respective housing element of the adjustment unit. By an optional second cross connection structure (upper cross connection structure), the adjustment units can be connected with each other in the section of the respective first adjustment elements thereof, especially in the section of the respective free ends thereof. The second cross connection structure can similarly form a coupling structure for coupling the drive device with the carrying device. By an optional third cross connection structure, the adjustment units can be connected with each other in the section of the respective second adjustment elements thereof, especially in the section of the respective free ends thereof. The third cross connection structure can similarly form a coupling structure for coupling the drive device with the frame-like support structure supporting the powder chamber.

The respective cross connection structures can correspondingly connect the adjustment units with each other in the section of a respective housing element of the adjustment unit or in the section of the respective adjustment elements of the adjustment unit and can correspondingly be coupled to the respective housing elements of the adjustment unit, or the respective adjustment elements of the adjustment unit. Respective cross connection structures increase the mechanical stability, especially the stiffness, of the entire drive device. Similarly, a cross connection structure, i.e. especially a cross connection structure connecting the adjustment units in the section of a respective housing element of the adjustment unit with each other, offers a possibility for a compact arrangement of the drive unit; the drive unit can be arranged on the cross connection structure, especially centered between the at least two adjustment units. A respective cross connection structure can at least partially be formed hollow such that it is provided for receiving the force transmission elements mentioned.

In order to seal the drive device, especially against the intrusion of construction material, the powder module can comprise a sealing element extendable in at least one direction and especially formed like a bellow. The sealing element is arranged or formed in vertical direction between the carrying device and the powder chamber or a powder chamber connecting part connecting on the bottom of the powder chamber. The powder chamber connecting part can be a receiving element limiting a receiving section provided for receiving construction material and comprising a flow channel structure.

The powder module typically has several components that in operation are to be supplied with data and/or energy. Appropriate components are for example the drive unit and the carrying device, i.e. especially a heater forming a component part of the carrying device. Accordingly, the powder module comprises data and/or supply lines especially for the supply of components of the powder module to be supplied with data and/or electricity, with data and/or electricity. Via appropriate supply lines depending on specific design, (electric) energy and/or data, especially control signals or parameters, can be transmitted. If required, it is possible that via supply lines, hydraulic or pneumatic working fluids are transmitted; appropriate supply lines can e.g. be formed as or comprise supply tubes.

The supply lines can be arranged directed in a chain-like guiding device comprising several guiding elements that are especially flexibly connected with each other. This is an especially compact and in terms of the manageability thereof a workable arrangement of the supply lines. The guiding device can especially be a multi-unit, elongated energy chain designed in an open or closed manner.

The powder module can, of course, comprise several respective guiding devices. A first guiding device can be attached to the carrying device via a first attachment section and to an immobile portion of the powder module, especially to a carrying structure arranged to an immobile portion of the powder module, via a second attachment section. The first guiding device can at least extend zigzag-like in a base position between the first attachment section and the second attachment section. A second guiding device can be attached to the drive device via a first attachment section and to an immobile portion of the powder module, especially to a carrying structure arranged to an immobile portion of the powder module, via a second attachment section. The second guiding device can—analogous to the first guiding device—at least extend zigzag-like in a base position between the first attachment section and the second attachment section. The respective base position typically corresponds to the lower end position of the carrying device. The immobile portion of the powder module can respectively be e.g. the already mentioned support structure of the powder module, supporting the powder chamber.

It was mentioned that the maximum traveling distance (lifting) of the carrying device can be between 800 and 2,000 mm, especially between 950 and 1,050 mm. Appropriately large traveling distances of the carrying device require a powder chamber that is formed appropriately high. Therefore, the powder chamber or a powder chamber base body limiting the powder room can be formed in a segmented manner. The powder chamber base body can be formed segmented into several powder chamber base body segments that can be or are attached to each other forming the powder chamber base body. By arranging respective powder chamber base body segments like stacks, principally powder chambers of any height and hence any heights of construction can be realized. The segmentation is relevant especially for the design of the powder module as construction module.

The segmentation of the powder chamber base body into the powder chamber base body segments is performed depending on the number of the powder chamber base body segments in at least one, possibly more, segmentation planes. A respective segmentation plane can basically be anywhere in the room; respective powder chamber base body segments can principally be arranged in horizontal and/or vertical orientation. Also inclined segmentation planes are principally imaginable regarding a horizontal or vertical reference plane.

The respective powder chamber base body segments in their geometric structural dimensions are selected such that they can each be manufactured in one production step. The so far problematic manufacturing of comparatively high powder or construction chambers, i.e. especially powder chambers the powder room of which exceeds a maximum height of at least 500 mm, i.e. possibly having 1,000 mm or more, with the requested narrow tolerances is hence addressed by a segmentation of the powder chamber into several powder chamber base body segments that can be attached or are attached to each other in the assembly state of the powder chamber forming the powder chamber base body.

With the possibility of attaching respective powder chamber base body segments to each other, powder chambers of any height can basically be formed. Of course, this also applies to the case of the stack-type vertical arrangement or attachment of respective powder chamber base body segments on top of each other. From this it follows that the powder chamber base body is formed in a segmented manner preferably in at least one horizontal segmentation plane, wherein the respective powder chamber base body segments when segmenting in the horizontal segmentation plane can be attached or are attached on top of each other in vertical or vertical adjacent arrangement.

The respective powder chamber base body segments can have a (hollow) parallelepiped, hollow cylindrical or an annular disk-shaped base shape. The powder chamber base body segments hence each comprise an interior room limited by the walls of the respective powder chamber base body segments, defined by the respective base shape thereof. The respective interior room of the powder chamber base body segments (in the assembly state of the powder chamber) forms a part of the powder room. Hence, each powder chamber base body segment typically limits one powder room portion describing an entire inner circumference of the powder room.

Basically, the powder chamber base body segments can be formed geometric-structurally identical or can be formed such that they differ in at least one geometric-structural parameter, especially the respective height thereof. In geometric structural terms, the powder chamber can hence comprise (several) identical powder chamber base body segments or (several) different powder chamber base body segments. The geometric structural dimensions of the respective powder chamber base body segments can be selected especially in terms of the realization of a certain desired height of the powder chamber or the powder room.

For attachment—the attachment can typically be detached (in a damage-free and non-destructive manner)—of powder chamber base body segments that can be or are attached to each other to form the powder chamber base body, at least one attachment element can be arranged or formed on each powder chamber base body segment. The respective attachment elements are provided to interact by forming a (detachable) attachment of at least two powder chamber base body segments that are to be connected or that are connected to form the base body. The respective attachment elements can be provided to interact by forming an attachment of at least two powder chamber base body segments that are to be connected or that are connected to form the base body in a form-locked and/or force-locked manner. This is especially understood to mean that the respective attachment elements are provided to interact with each other by forming a form-locked and/or force-locked connection or are provided to form such a connection.

In respective attachment elements these can hence possibly be corresponding form-locked elements provided to interact with each other by forming a form-locked connection or provided to produce such a connection, or possibly corresponding force-locked elements provided to interact with each other by forming a force-locked connection or provided to produce such a connection. Respective form-locked elements can specifically be formed e.g. as a projection and hence (corresponding) receiver or recess. Consequently, by interaction of corresponding form-locked elements, e.g. a tongue-and-groove-joint or a connection of such a type can be formed. Respective force-locked elements can specifically be formed as bolts or alignment pins and hence (corresponding) receivers or recesses possibly provided with a mating thread. Consequently, by interaction of corresponding force-locked elements, e.g. a bolt or alignment pin-connection or a connection of such a type can be formed.

For that option, according to which the respective attachment elements are provided, to interact by forming a fastening of at least two powder chamber base body segments that are to be connected or are connected to each other for forming the base body in a force-locked manner, it is imaginable that the attachment elements are formed as at least attachment receivers or recesses that at least partially can be penetrated by, especially bore-like, attachment bolts, and are penetrated by a corresponding attachment bolt in the status of being attached to each other at least partially. An attachment bolt can be a threaded bolt or a stud bolt. An attachment receiver or recess of a first powder chamber base body segment is formed as a through-hole, an attachment receiver or recess of a second powder chamber base body segment to be connected with the first powder chamber base body segment can be formed as a blind hole. In order to handle respective powder chamber base body segments in any way, each powder chamber base body segment can be provided in the section of an (upper) first edge portion with a through-hole, and in the section of a (lower) first edge portion arranged or formed opposite said through-hole with a blind hole.

Respective attachment receivers or recesses can be arranged or formed in a (cross-sectionally seen) tapered recess section of the respective powder chamber base body segment such that they do not extend the outer dimensions of the respective powder chamber base body segment or the entire powder chamber.

The powder chamber base body segments are typically metal components manufactured by machining, especially milling, operation. Manufacturing the powder chamber base body segments by wire eroding or wire cutting is also imaginable.

The metal material forming the powder chamber base body segments can be a light metal, especially aluminum or an aluminum alloy. In addition to a comparatively little weight regarding manufacturing, light metals are characterized by a comparatively simple machinability.

The geometric structural dimensioning of the powder chamber or the powder room is purposefully designed for the additive manufacturing of comparatively large or elongated components or component structures ("large-scale structures"). These can e.g. be components of a motor vehicle, i.e. vehicle body structures like door structures.

Therefore, the powder room can e.g. have a maximum depth of 1,400 mm, especially in a range between 800 and 2,000 mm. Here, of course, upwards and downwards exceptions are possible.

In addition to the powder module, the invention also relates to an apparatus for additive manufacturing of three-dimensional objects. The apparatus, which especially is a SLS apparatus or a SLM apparatus is characterized in that it comprises at least one powder module as described. All embodiments in connection with the powder module thus analogously apply to the apparatus.

The invention is explained in more detail by means of an exemplary embodiment in the figures of the drawings. In which:

FIG. 1-3 each show a schematic diagram of a powder module according to an exemplary embodiment; and FIGS. 4, 5 each show a schematic diagram of a drive device according to an exemplary embodiment.

FIG. 1 shows a schematic diagram of a powder module 1 according to an exemplary embodiment in a (longitudinal) sectional view. FIG. 2 shows the powder module 1 in an illustration that is partially broken and rotated by 90° compared to FIG. 1. FIG. 3 shows the powder module 1 in an illustration that is partially set off and rotated by 180° compared to FIG. 2.

The powder module 1 represents a functional component of an apparatus (not shown) for additive manufacturing of three-dimensional objects. A respective apparatus is provided for additive manufacturing of at least one object by successive, selective layer-by-layer exposure and thus solidification of individual construction material layers of a construction material (not shown) that can be solidified by means of at least one energy beam (not shown). The construction material that can be solidified can for example be a metal powder. A metal powder can also mean a powder mixture of different metals. Thus, it applies to a metal powder that it can also be a powder of at least one metal alloy. The energy beam can be a laser beam. The apparatus can be an apparatus for performing selective laser melting methods (SLM methods in short) or selective laser sintering methods (SLS methods in short), i.e. a selective laser melting apparatus (SLM apparatus) or a selective laser sintering apparatus (SLS apparatus).

The powder module 1 can generally be any powder module, which is provided for receiving and/or dispensing construction material. In particular, the powder module 1 can be a construction module in which the actual additive construction of objects is performed and which, for this purpose, is filled with construction material to be solidified in a successive, selective layer-by-layer manner when performing additive manufacturing processes, a metering module via which, when performing additive manufacturing processes, construction material is metered out into a process chamber successively and in layers, or a collector module which, when performing additive manufacturing processes, is filled with construction material that is not solidified. In the exemplary embodiment shown in the Figures, the powder module 1 is a construction module, wherein subsequent explanations are not limited to the design of the powder module 1 as a construction module.

The powder module 1 comprises a powder chamber 2. The powder chamber 2 limits a powder room 3 that can be filled with construction material. The powder room 3 is limited at least on the side by walls (not denoted in more detail) of the powder chamber 2. At the bottom, the powder room 3 is limited by a carrying device 4. The carrying device 4 is typically movably supported between two end positions, i.e. between an upper end position (related to the height of the powder module 1) and a lower end position shown in FIG. 1, relative to the powder chamber 2. The movable support of the carrying device 4 enables the realization of an especially linear movement of the carrying device 4 along a vertical movement axis or in a vertical movement direction.

The movable support of the carrying device 4 is realized by a drive device 5 (also cf. FIG. 4, 5) coupled to said carrying device. The drive device 5 is provided for forming or generating a force (driving force) setting the carrying device 4 in a respective motion relative to the powder chamber 2.

The drive device 5 comprises two separate (electro) mechanical adjustment units 6a, 6b, which can also be referred to or considered as adjustment actuators. From the FIGS. 2-5 it can be seen that the adjustment units 6a, 6b are arranged in parallel next to each other. Each adjustment unit 6a, 6b comprises two adjustment elements 7a, 7b. A respective first adjustment element 7a is coupled with the carrying device 4; a respective second adjustment element 7b is coupled with a support structure 9 of the powder module 1, supporting the powder chamber 2.

Each adjustment element 7a, 7b is movably supported relative to a respective housing element 8a, 8b of the respective adjustment unit 6a, 6b, in which various components of the respective adjustment unit 6a, 6b are arranged or formed, between a first end position and a second end position, and vice versa.

The first end position corresponds to the end position shown in FIG. 5 that is fully extended from the housing element 8a, 8b of the respective adjustment element 7a, 7b; the second end position corresponds to the end position shown in FIG. 4 that is fully retracted into the respective housing element 8a, 8b of the respective adjustment element 7a, 7b. In the first end position of the adjustment elements 7a, 7b, the carrying device 4 is moved into its upper end position; the first end position of the adjustment elements 7a, 7b hence corresponds to the upper end position of the carrying device 4. In the second end position of the adjustment elements 7a, 7b, the carrying device 4 is moved into its lower end position; the second end position of the adjustment elements 7a, 7b hence corresponds to the lower end position of the carrying device 4. Apparently, the respective adjustment elements 7a, 7b of an adjustment unit 6a, 6b are connected in series, i.e. arranged or aligned in a common (vertical) axis, which is parallel to the (vertical) movement axis of the carrying device 4.

The movements of the adjustment elements 7a, 7b are typically equally directed. The traveling distance (overall lifting) of the carrying device 4 that can overall be realized with a respective adjustment unit 6a, 6b results from the sum of sub-traveling distances (sub-liftings) that can be realized by means of the adjustment elements 7a, 7b associated with the respective adjustment unit 6a, 6b between the respective first and second end positions thereof.

A respective adjustment element 7a, 7b has a cylindrical geometric base shape. In the exemplary embodiment shown in the Figures, a respective adjustment element 7a, 7b is a telescope cylinder, which comprises several adjustment element portions (not denoted in more detail) that are arranged in each other and that can be moved relative to each other. Said telescope-like or telescope-shaped design of the adjustment elements 7a, 7b is purposeful, especially in terms of the realization of comparatively large traveling distances (liftings) of the carrying device 4, i.e. especially traveling distances of at least 500 mm. At this point, it is to be noted that the maximum traveling distance (lifting) of the carrying device 4 can be between 800 and 2,000 mm, especially between 950 and 1,050 mm.

The drive unit 10 is associated with a drive device 5. The drive unit 10 formed as an (electric) drive motor is provided for generating a force setting the carrying device 4 in motion relative to the powder chamber 2. The force generated by the drive unit 10 is transmitted via force transmission elements (not shown), i.e. belts, pinions, etc. to the respective adjustment units 6a, 6b or the respective adjustment elements 7a, 7b of the adjustment unit to move these elements between the respective end positions thereof. An example of an arrangement of respective force transmission elements provides for at least one force transmission belt (not shown) connected between the drive unit 10 and one adjustment piston of the adjustment unit in the form of a thread drive, especially a spindle or a ball-type linear drive. The force transmission belt is coupled with the pinion end of the drive unit 10 and the driving side of the adjustment piston of the adjustment unit.

From FIGS. 4, 5 it is seen that the adjustment units 6a, 6b are connected by several cross connection structures 11a, 11b, 11c, which are each a crossbeam or a crossbar. The adjustment units 6a, 6b are connected with each other by a first cross connection structure 11a (middle cross connection structure) in the section of a respective housing element 8a, 8b of the adjustment unit. By a second cross connection structure 11b (upper cross connection structure), the adjustment units 6a, 6b are connected with each other in the section of the respective first adjustment elements 7a thereof, especially in the section of the respective free ends thereof. The second cross connection structure 11b similarly forms a coupling structure for coupling the drive device 5 with the carrying device 4. By a third cross connection structure 11c, the adjustment units 6a, 6b are connected with each other in the section of the respective second adjustment elements 7b thereof, especially in the section of the free ends thereof. The third cross connection structure 11c similarly forms a coupling structure for coupling the drive device 5 with the support structure 9 supporting the powder chamber 2.

Apparently, the first cross connection structure 11a offers a possibility for a compact arrangement of the drive unit 10; the drive unit 10 is arranged, especially centered, between the at least two adjustment units 6a, 6b, on the first cross connection structure 11a. At least the first cross connection structure 11a can at least partially be formed hollow such that it is provided for receiving the force transmission elements mentioned.

In order to seal the drive unit 10, especially against intrusion of construction material, the powder module 1 comprises a sealing element 12 extendable in a vertical direction and especially formed like a bellow. The sealing element 12 is arranged in vertical direction between the carrying device 4 and the powder chamber 2 or a powder chamber connecting part 13 connecting on the bottom of the powder chamber 2. In the exemplary embodiment shown in the Figure, the powder chamber connecting part 13 is a receiving element limiting a receiving section provided for receiving construction material and comprising a flow channel structure.

The powder module 1 has several components that in operation are to be supplied with data and/or energy. Appropriate components are for example the drive unit 10 and the carrying device 4, i.e. especially a plate-like heater 14 forming a component part of the carrying device 4. Accordingly, the powder module 1 comprises data and/or supply lines (not denoted in more detail) for the supply of components of the powder module 1 to be supplied with data and/or electricity, with data and/or electricity. Via appropriate supply lines depending on specific design, (electric) energy and/or data, especially control signals or parameters, can be transmitted.

The supply lines are arranged directed in a chain-like guiding devices 15a, 15b comprising several guiding elements (not denoted in more detail) that are especially flexibly connected with each other. The guiding devices 15a, 15b are each a multi-unit, elongated energy chain designed in an open or closed manner. The guiding devices 15a, 15b are not shown in FIG. 2, in order to better illustrate the parallel arrangement of the adjustment units 6a, 6b.

From FIG. 1 it is seen that a first guiding device 15a is attached by an (upper) first attachment section (not denoted in more detail) on the carrying device 4, and by a (lower) second attachment section (not denoted in more detail) on an immobile portion of the powder module 1, i.e. on a plate-like or plate-shaped carrying structure 16a arranged on an immobile portion of the powder module 1. The first guiding device 15a extends in a base position at least zigzag-like between the first attachment section and the second attachment section (cf. FIG. 3). A second guiding device 15b is attached by a first attachment section (not denoted in more detail) on the drive device 5, and by a second attachment section (not denoted in more detail) also on an immobile portion of the powder module 1, i.e. on a plate-like or plate-shaped carrying structure 16b arranged on an immobile portion of the powder module 1. The second guiding device 15b extends— analogous to the first guiding device 15a—at least zigzag-like in a base position between the first attachment section and the second attachment section. The respective base positions correspond to the lower end position of the carrying device 4. The immobile portion of the powder module 1 is each the support structure 9 supporting the powder chamber 2.

It was mentioned that the maximum traveling distance (lifting) of the carrying device 4 can be between 800 and 2,000 mm, especially between 950 and 1,050 mm. Appropriately large liftings of the carrying device 4 require a powder chamber 2 that is formed appropriately high. Therefore, the powder chamber 2 or a powder chamber base body (not denoted in more detail) limiting the powder room 3 can be formed segmented into several powder chamber base body segments 2a, 2b that can be attached or are attached to each other forming the powder chamber base body (cf. FIG. 1). By arranging respective powder chamber base body segments 2a, 2b like stacks, principally powder chambers 2 of any height and hence any heights of construction can be realized. The segmentation of the powder chamber 2 or the powder chamber base body constitutes an optional design of the powder chamber 2, as mentioned.

The invention claimed is:

1. A powder module for an apparatus for additive manufacturing of three-dimensional objects, the powder module comprising:
   a powder chamber defining a powder room configured to receive a powdered construction material;
   a carrying device disposed within the powder room and defining a bottom portion of the powder room, the carrying device being movably supported relative to the powder chamber; and
   a drive device configured to move the carrying device relative to the powder chamber, wherein the drive device comprises at least two adjustment units, the at least two adjustment units respectively comprising:
   a housing element,
   a first telescoping adjustment element movably supported between a first end position and a second end position relative to a first side of the housing element, and
   a second telescoping adjustment element movably supported between a first end position and a second end position relative to a second side of the housing element,
   wherein the first telescoping adjustment element and the second telescoping adjustment have a common vertical axis.

2. The powder module of claim 1, comprising:
   a support structure configured to support the powder chamber, wherein the respective first telescoping adjustment elements are coupled between the housing element and the carrying device, and the respective second telescoping adjustment elements are coupled between the housing element and the support structure.

3. The powder module of claim 1, wherein the drive device comprises at least one motor-driven drive unit associated with the at least two adjustment units, the at least one motor-derive drive unit configured to move the carrying device relative to the powder chamber.

4. The powder module of claim 1, wherein the at least two adjustment units are arranged in parallel to one another.

5. The powder module of claim 1, comprising:
   a cross-connection structure coupling the at least two adjustment units to one another.

6. The powder module of claim 5, wherein the drive unit is disposed between the at least two adjustment units and coupled to the cross connection structure.

7. The powder module of claim 5, wherein the cross connection structure connects the at least two adjustment units with one other at the respective housing element of the at least two adjustment units.

8. The powder module of claim 5, comprising:
   an additional cross connection structure connecting the at least two adjustment units with one other.

9. The powder module of claim 8, wherein the additional cross connection structure connects the at least two adjustment units with one other at the respective first telescoping adjustment elements of the at least two adjustment units, or at the respective second telescoping adjustment elements of the at least two adjustment units.

10. The powder module of claim 1, comprising:
    at least one data and/or power supply cable configured to supply components of the powder module with data and/or electricity, wherein the at least one data and/or power supply cable is arranged in a guiding device comprising a plurality of chain-like guiding elements flexibly connected with one another.

11. The powder module of claim 10, comprising:
    a plurality of guiding devices, the plurality of guiding devices comprising:
    a first data and/or power supply cable arranged in a first guiding device, the first guiding device attached between the carrying device a carrying structure, and
    a second data and/or power supply cable arranged in a second guiding device, the second guiding device attached between the drive device and the carrying structure.

12. The powder module of claim 1, comprising:
    a sealing element extendable in at least one direction, the sealing element arranged or formed in vertical direction between the carrying device and the powder chamber.

13. The powder module of claim 1, wherein a traveling distance of the carrying device is from 800 millimeters to 2,000 millimeters.

14. The powder module of claim 1, wherein the powder chamber comprises a powder chamber base body defining the powder room, wherein the powder chamber base body comprises a plurality of powder chamber base body segments attached to one another.

15. An apparatus for additive manufacturing of three-dimensional objects, the apparatus comprising:
- a powder module, wherein the powder module comprises:
  - a powder chamber defining a powder room configured to receive a powdered construction material;
  - a carrying device disposed within the powder room and defining a bottom portion of the powder room, the carrying device being movably supported relative to the powder chamber; and
  - a drive device configured to move the carrying device relative to the powder chamber, wherein the drive device comprises at least two adjustment units, the at least two adjustment units respectively comprising:
    - a housing element,
    - a first telescoping adjustment element movably supported between a first end position and a second end position relative to a first side of the housing element, and
    - a second telescoping adjustment element movably supported between a first end position and a second end position relative to a second side of the housing element,
    - wherein the first telescoping adjustment element and the second telescoping adjustment have a common vertical axis.

16. The apparatus of claim 15, comprising:
- a support structure configured to support the powder chamber, wherein the respective first telescoping adjustment elements are coupled between the housing element and the carrying device, and the respective second telescoping adjustment elements are coupled between the housing element and the support structure.

17. The apparatus of claim 15, wherein the drive device comprises at least one motor-driven drive unit associated with the at least two adjustment units, the at least one motor-derive drive unit configured to move the carrying device relative to the powder chamber.

18. The apparatus of claim 15, wherein the at least two adjustment units are arranged in parallel to one another.

19. The apparatus of claim 15, comprising:
- a cross-connection structure coupling the at least two adjustment units to one another at the respective housing element of the at least two adjustment units, wherein the drive unit is disposed between the at least two adjustment units and coupled to the cross connection structure.

20. The apparatus of claim 19, comprising:
- an additional cross connection structure connecting the at least two adjustment units with one other at the respective first telescoping adjustment elements, or, at the respective second telescoping adjustment elements, of the at least two adjustment units.

\* \* \* \* \*